(12) United States Patent
Tabor et al.

(10) Patent No.: US 6,743,844 B1
(45) Date of Patent: Jun. 1, 2004

(54) SPILL RESISTANT CARPET BACKING

(75) Inventors: Rick L. Tabor, Lake Jackson, TX (US); Rhonda R. Suarez, Dalton, GA (US); Randall C. Jenkines, Dalton, GA (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/762,546

(22) PCT Filed: Aug. 17, 1999

(86) PCT No.: PCT/US99/18672

§ 371 (c)(1),
(2), (4) Date: Feb. 8, 2001

(87) PCT Pub. No.: WO00/09798

PCT Pub. Date: Feb. 24, 2000

Related U.S. Application Data

(60) Provisional application No. 60/096,777, filed on Aug. 17, 1998.

(51) Int. Cl.$^7$ .............................. C08J 3/00; C08K 3/20; C08L 75/00; B32B 3/02; B32B 33/00
(52) U.S. Cl. ..................... 524/270; 428/32; 428/85; 428/94; 428/95; 428/96; 428/97; 523/200; 523/210; 524/276; 524/284; 524/394; 524/499; 524/591; 524/839; 524/840
(58) Field of Search .................. 524/270, 276, 524/284, 394, 591, 839, 499, 840; 523/200, 210; 428/32, 85, 94, 95, 96, 97

(56) References Cited

U.S. PATENT DOCUMENTS

| | | | |
|---|---|---|---|
| 3,437,624 A | 4/1969 | Dawn et al. ................ 260/29.2 |
| 3,664,262 A | 5/1972 | Rose et al. .................... 102/56 |
| 3,890,261 A | 6/1975 | Fitzgerald .................. 260/23.7 |
| 4,092,286 A | 5/1978 | Noll et al. .................. 260/29.2 |
| 4,164,489 A | 8/1979 | Daniels et al. ............. 260/29.6 |
| 4,228,058 A | 10/1980 | Hulyalkar et al. ......... 260/29.7 |
| 4,237,264 A | 12/1980 | Noll et al. ..................... 528/67 |
| 4,296,159 A | 10/1981 | Jenkines et al. .............. 428/95 |
| 4,336,089 A | 6/1982 | Asperger ..................... 156/152 |
| 4,619,853 A | 10/1986 | Blyth et al. ................... 428/95 |
| 4,643,930 A | 2/1987 | Ucci ............................ 428/96 |
| 4,689,256 A | 8/1987 | Slosberg et al. .............. 428/95 |
| 4,714,728 A | 12/1987 | Graham et al. ............. 524/272 |
| 4,742,095 A | 5/1988 | Markusch et al. .......... 523/322 |
| 4,857,565 A | 8/1989 | Henning et al. ............ 523/343 |
| 4,879,322 A | 11/1989 | Markusch et al. .......... 523/322 |
| 5,037,864 A | 8/1991 | Anand et al. ................ 523/348 |
| 5,221,710 A | 6/1993 | Markusch et al. .......... 524/591 |
| 5,300,551 A | 4/1994 | Candries et al. ............ 524/458 |
| 5,348,785 A | 9/1994 | Vinod .......................... 428/95 |
| 5,380,785 A | 1/1995 | Ngoc et al. .................. 524/504 |
| 5,539,021 A | 7/1996 | Pate et al. ................... 523/335 |
| 5,558,916 A | 9/1996 | Heim et al. ................... 428/95 |
| 5,591,806 A | 1/1997 | Recchia et al. ............. 525/369 |
| 5,661,205 A | 8/1997 | Satoh et al. ................. 524/376 |
| 5,741,393 A | 4/1998 | Hargis et al. ............. 156/307.5 |
| 5,763,040 A | 6/1998 | Murphy et al. ............... 428/96 |
| 5,770,660 A | 6/1998 | Lightsey ....................... 526/66 |

FOREIGN PATENT DOCUMENTS

| | | | | |
|---|---|---|---|---|
| DE | 1957159 | | 5/1971 | ............. C09D/5/02 |
| DE | 3215890 A | | 11/1983 | ............. C09C/3/00 |
| JP | 60017174 A | | 1/1985 | ........... D06M/15/00 |
| JP | 62090376 | | 4/1987 | |
| RU | 2047626 C | | 10/1995 | ............ C08L/61/10 |
| WO | WO 97/00995 | | 1/1997 | ......... D06M/15/277 |
| WO | WO 98/41552 | | 9/1998 | ............ C08G/18/08 |

OTHER PUBLICATIONS

Brentin, R.P. "Latex Coating Systems For Carpet Backing." Journal of Coated Fabrics, vol. 12 (Oct. 1982), p. 82–91.
Fitzgerald, P.L. "Integral Latex Foam Carpet Cushioning." Journal of Coated Fabrics, vol. 7 (Oct. 1977), p. 107–120.
"Process for Preparing Carpets Having Polyurethane Backings Obtained from Polyurethane Latex Formulations", filed in the United States of America on Mar. 16, 1998, application Ser. No. 09/039,978; Applicants: J. J. Jakubowski, et al.
"Polyurethane Latexes, Processes for Preparing Them and Polymers Prepared Therewith", filed in the United States of America on Mar. 16, 1998, application Ser. No. 09/039,796; Applicants: J. J. Jakubowski, et al.

*Primary Examiner*—Patrick D. Niland

(57) ABSTRACT

An aqueous dispersed polymeric composition for preparing the spill resistant carpet backing is provided. The aqueous dispersed polymeric composition of the present invention comprises an aqueous dispersed polymeric material, an inorganic filler, and a hydrophobic compound selected from the group consisting of a hydrophobic acid, a salt of a hydrophobic acid, and mixtures thereof. Alternatively, the inorganic filler is pretreated with the hydrophobic compound. Also, a kit and a method for preparing a spill resistant carpet backing from the aqueous dispersed polymeric composition is provided.

26 Claims, No Drawings

SPILL RESISTANT CARPET BACKING

This application claims the benefit of U.S. Provisional Application Serial No. 60/096,777 filed Aug. 17, 1998.

FIELD OF THE INVENTION

This invention relates to a spill resistant carpet backing. More particularly, it relates to using a hydrophobic acid-treated inorganic filler or salts thereof as part of an aqueous dispersed polymeric composition to increase the spill resistance of a carpet backing.

DESCRIPTION OF THE PRIOR ART

Generally, tufted carpets minimally consist of tufted fibers through a primary backing and a precoat. Tufted carpets have a precoat and may also have additional layers such as a laminate layer, a secondary layer, and a foam layer. Moreover, the tufted carpet may have more than one secondary layer. The tufted carpet may be applied to a variety of subfloors, including wood, concrete, and tile.

The precoat is required to anchor the carpet tufts to the primary backing. It may also contain an adhesive to adhere the tufted carpet to additional layers or the subfloor. The precoat can affect the carpet's tuft bind, hand, delaminating properties, wet strength properties, wear resistance, and barrier performance. Alternatively, a laminate layer may be applied without a precoat and anchor the carpet tufts to the primary backing. But, better anchoring is achieved when a precoat is applied than with a laminate layer is applied alone.

The precoat may be prepared from several materials. However, it is usually prepared from a polyurethane material or a styrene-butadiene latex. It may be prepared from a butadiene-acrylonitrile latex, an ethylene-vinyl acetate latex, a styrene-butadiene-butyl acrylate latex, a chloroprene latex, a polyethylene copolymer latex, an ethylene-styrene latex, a styrene-butadiene-vinylidene chloride latex, a styrene-alkyl acrylate latex, a vinyl latex, or an acrylic latex.

With regard to a polyurethane precoat, conventional practice in the carpet manufacturing industry requires that the precoat be prepared from an isocyanate formulation (A-side formulation) and a polyol formulation (B-side formulation) at the carpet manufacturing site. This is sometimes referred to as "A+B chemistry". Preparing a polyurethane precoat by A+B chemistry can result in unpredictable loss of production and inefficiency due to problems that can occur in carrying out the reaction at the manufacturing site, such as premature gellation.

Alternatively, the polyurethane precoat may be applied as an aqueous polyurethane (PU) dispersion. Aqueous PU dispersions can be prepared by polymerizing the polyurethane reactants in an organic solvent followed by dispersion of the resulting solution in water, and optionally followed by removal of organic solvent. See U.S. Pat. Nos. 3,437,624; 4,092,286; 4,237,264; 4,742,095; 4,857,565; 4,879,322; 5,037,864; and 5,221,710, which are incorporated herein by reference. Also, an aqueous polyurethane dispersion may be prepared by first forming a prepolymer, next dispersing the prepolymer in water, and finally conducting a chain extension in the water as disclosed in WO 98/41552, published Sep. 24, 1998, which is incorporated herein by reference. Preparations of aqueous dispersions of polyurethane are also described in U.S. patent application Ser. Nos. 09/039,978 and 09/039,976. U.S. Pat. No. 4,296,159 to Jenkines, et al., discloses preparing a tufted or woven article having a unitary backing prepared by applying a polyurethane forming composition to the underside of the tufted or woven article.

The precoat may consist of an aqueous styrene butadiene latex. Styrene-butadiene (SB) latexes for use in carpet are described, for example, in P. L. Fitzgerald, "Integral Latex Foam Carpet Cushioning", J. Coat Fab. 1977, Vol. 7 (pp.107–120); and in R. P. Brentin, "Latex Coating Systems for Carpet Backing", J. Coat. Fab. 1982, Vol. 12 (pp. 82–91). SB latexes provide flexibility in production costs owing to the ability to include low to high concentrations of filler component in a low viscosity latex. However, SB latexes with filer may not, meet the rigorous standards set for intermediate grade carpets. In addition, current technology may require that a latex material remain stable for a period of up to one year. High solids content affects the stability of SB latexes. Accordingly, commercially available SB latexes typically do not have a solids content of greater than 55%.

Without regard to the type of material used to make the precoat, a liquid spill can detrimentally affect the carpet's performance and appearance. The liquid can flow through the precoat and then onto, or be absorbed by, the underside of the carpet. In particular, spilled liquids such as beverage drinks, food, blood, urine, and feces can penetrate to the underside of the carpet or into the subfloor so that the liquids can be inaccessible by various cleaning methods.

When the precoat is an aqueous polymeric dispersion, various conventional methods are used to provide a moisture or spill resistant barrier between the primary backing and other layers or the subfloor. The conventional methods include (1) modifying the precoat formulation, (2) adding an essentially impermeable membrane between the precoat and the other layers or the subfloor, and (3) applying a spill resistant coating onto the precoat or another layer.

An example of an attempt to improve spill resistance by modifying the precoat formulation is increasing the coating weight of the dispersion. This method is undesirable because it requires more material, which is expensive. It can also yield a final carpet having undesirable hand or stiffness properties. Moreover, the precoat has an increased probability of blistering in the drying ovens.

Another example of an attempt to improve spill resistance by modifying the precoat formulation is adding a wax filler to the dispersion. While the addition of waxes to aqueous styrene-butadiene latexes is known to improve the water barrier properties of the precoat, it is also known that wax additives are generally detrimental to other carpet properties.

Another example of a formulation modification is the reduction of filler levels. But, this formulation change increases the carpet cost and may increase the tendency of the precoat to blister in the drying ovens.

Examples of an attempt to improve spill resistance by adding an essentially impermeable membrane between the precoat and the other layers or the subfloor are described in U.S. Pat. Nos. 4,336,089 and 5,763,040. In U.S. Pat. No. 4,336,089; the patentees describe a water-impervious film that collects the spilled liquid below the carpet surface. In U.S. Pat. No. 5,763,040, the patentees describe applying a non-permeable fabric or film to a carpet backing. This secondary backing prevents liquid flow to subsequent layer or to the subfloor. Unfortunately, both described membranes may permit the spilled liquid to collect at a depth between the carpet and the underlay barrier such that the spilled liquid cannot be removed through traditional cleaning methods.

An example of an attempt to improve spill resistance by applying a spill resistant coating is applying a fluorochemical or another material onto the precoat or another layer.

U.S. Pat. No. 5,348,785 describes applying a fluorochemical on the underside of a secondary backing. The use of fluorochemicals to impart water impermeability is also described in U.S. Pat. Nos. 4,619,853 and 4,643,930. Unfortunately, the use of fluorochemicals can increase the cost of the carpet. Additionally, steam or extraction cleaning of a carpet can leach the fluorochemicals out of the carpet.

Other materials that are applied as a spill resistant coating include silicone-based compositions, wax emulsions, naturally occurring oils, and hydrophobic acrylate resins. Applying these various hydrophobic compositions to a secondary backing is described in U.S. Pat. No. 5,558,916, but these compositions do not prevent absorption of spilled liquids by underlying layers.

It would be desirable to prepare a carpet backing that resists penetration by spilled liquids. It would also be desirable to prepare the carpet backing by a process that would not significantly increase the cost of manufacturing the carpet. Further, it would be desirable to prepare a spill resistant carpet backing that can protect the underside of a carpet from spills such that the spilled liquids would be accessible for removal by various cleaning methods.

SUMMARY OF THE INVENTION

According to the present invention, a spill resistant carpet backing is provided. More specifically, an aqueous dispersed polymeric composition for preparing the spill resistant carpet backing is provided In the preferred embodiment, the aqueous dispersed polymeric composition of the present invention comprises an aqueous dispersed polymeric material, an inorganic filler, and a hydrophobic compound selected from the group consisting of a hydrophobic acid, a salt of a hydrophobic acid, and mixtures thereof. Alternatively, the inorganic filler is pretreated with the hydrophobic compound. Also, a kit and a method for preparing a spill resistant carpet backing from the aqueous dispersed polymeric composition is provided. While the most significant impact on spill resistance is achieved through using the aqueous dispersed polymeric composition as a precoat, the aqueous dispersed composition may be applied as a laminate layer or a foam layer to improve spill resistance.

DESCRIPTION OF THE INVENTION

In the preferred embodiment of the present invention, the aqueous dispersed polymeric composition comprises an aqueous dispersed polymeric material, an inorganic filler, and a hydrophobic compound selected from the group consisting of a hydrophobic acid, a salt of a hydrophobic acid, and mixtures thereof. The aqueous dispersed polymeric material is selected from the group consisting of a polyurethane dispersion, a styrene-butadiene latex, a butadiene-acrylonitrile latex, an ethylene-vinyl acetate latex, a styrene-butadiene-butyl acrylate latex, a chloroprene latex, a polyethylene copolymer latex, an ethylene-styrene latex, a styrene-butadiene-vinylidene chloride latex, a styrene-alkyl acrylate latex, a vinyl latex, an acrylic latex, and mixtures thereof. The preferred aqueous dispersed polymeric composition is a polyurethane dispersion.

In the present invention, polyurethane can refer to a polyurethane compound, a polyurea compound, or mixtures thereof A polyurethane compound can be obtained by the reaction of a polyol with a polyisocyanate. A polyurea compound can be obtained by the reaction of an amine with a polyisocyanate. A polyurethane compound or polyurea compound can contain both urea and urethane functionality, depending on what compounds are included in the A and/or aside formulations. For the purposes of the present application, no further distinction will be made herein between the polyurethane compounds and polyurea compounds. The term "polyurethane" will be used generically to describe a polyurethane compound, a polyurea compound, and mixtures thereof.

A polyurethane dispersion composition useful in the practice of the present invention includes water, and a polymeric compound selected from the group consisting of a polyurethane compound, a mixture of polyurethane-forming compounds, and mixtures thereof. A polyurethane dispersion as described herein can include chain extenders, surfactants, fillers, dispersants, foam stabilizers, thickeners, fire retardants, defoamers, and other materials useful in polyurethane formulations.

Polyurethane-forming compounds as used in the present invention are compounds that are capable of forming polyurethane polymers. Polyurethane-forming compounds include, for example, polyurethane prepolymers. Prepolymers useful in the practice of the present invention are prepared by the reaction of active hydrogen compounds with any amount of isocyanate in excess material relative to active hydrogen material. The isocyanate functionality can be present in an amount of from about 0.2 wt % to about 40 wt %. A suitable prepolymer can have a molecular weight in the range of from about 100 to about 10,000. Prepolymers useful in the practice of the present invention should be substantially liquid under the conditions of dispersion.

Active hydrogen compounds can be described as compounds having functional groups that contain at least one hydrogen atom bonded directly to an electronegative atom such as nitrogen, oxygen or sulfur. Suitable active hydrogen compounds can be polyols of molecular weight of less than about 6000.

When the polymeric material is a polyurethane compound, the aqueous dispersed polymeric composition can include a chain extender. A chain extender is used herein to build the molecular weight of the polyurethane prepolymer by reaction of the chain extender with the isocyanate functionality in the polyurethane prepolymer, i.e., chain extend, the polyurethane prepolymer. A suitable chain extender is typically a low equivalent weight active hydrogen containing compound, having about 2 or more active hydrogen groups per molecule. The active hydrogen groups can be hydroxyl, mercaptyl, or amino groups. An amine chain extender can be blocked, encapsulated, or otherwise rendered less reactive. Other materials, particularly water, can function to extend chain length and so are chain extenders for purposes of the present invention. Polyamines are preferred chain extenders. It is particularly preferred that the chain extender be selected from the group consisting of amine terminated polyethers such as, for example, Jeffamine D400 from Huntsman Chemical Company, amino ethyl piperazine, 2-methyl piperazine, 1,5-diamino-3-methylpentane, isophorone diamine, ethylene diamine, diethylene triamine, triethylene tetramine, triethylene pentamine, ethanol amine, lysine in any of its stereoisomeric forms and salts thereof, hexane diamine, hydrazine and piperazine. In the practice of the present invention, the chain extender is often used as a solution of chain extender in water.

Small amounts of chain extender can be advantageously used. Generally, the chain extender is employed at a level sufficient to react with from about zero (0) to about 100 percent of the isocyanate functionality present in the prepolymer, based on one equivalent of isocyanate reacting with one equivalent of chain extender. It can be desirable, under certain conditions, to allow water to act as a chain extender and react with some or all of the isocyanate functionality present A catalyst can be used to promote the reaction between a chain extender and an isocyanate. Suitable catalysts include tertiary amines, organometallic compounds, similar compounds, and mixtures thereof. For example, suitable catalysts include di-n-butyl tin bis(mercaptoacetic acid isooctyl ester), dimethyltin dilaurate, dibutyltin dilaurate, dibutyltin sulfide, stannous octoate, lead octoate, ferric acetylacetonate, bismuth carboxylates, triethylenediamine, N-methyl morpholine, similar compounds, and mixtures thereof. An amount of catalyst is advantageously employed such that a relatively rapid cure to a tack-free state can be obtained. If an organometallic catalyst is employed, such a cure can be obtained by using from about 0.01 to about 0.5 parts per 100 parts of the polyurethane-forming composition, by weight. If a tertiary amine catalyst is employed, the catalyst preferably provides a suitable cure using from about 0.01 to about 3 parts of tertiary amine catalyst per 100 parts of the polyurethane-forming composition, by weight. Both an amine type catalyst and an organometallic catalyst can be employed in combination.

The present invention can include other filler materials. The filler material can include conventional fillers such as milled glass, calcium carbonate, aluminum trihydrate, talc, bentonite, antimony trioxide, kaolin, fly ash, or other known fillers. A suitable filler loading in a polyurethane dispersion can be from about 100 to about 1000 parts of filler per 100 parts of the polyurethane compound. Preferably, the filler material can be loaded in an amount of at least about 200 pph (phr), more preferably at least about 300 pph, most preferably at least about 400 pph.

The present invention can include a filler wetting agent. A filler wetting agent generally renders the filler material compatible with a polyurethane-forming composition. Useful wetting agents include phosphate salts such as sodium hexametaphosphate. A filler wetting agent can be included in a polyurethane-forming composition of the present invention at a concentration of at least about 0.5 parts per 100 parts of filler, by weight The present invention can include other components, such as surfactants, blowing agents, frothing agents, defoamers, fire retardants, pigments, antistatic agents, reinforcing fibers, antioxidants, preservatives, acid scavengers, and the like. Useful surfactants include cationic and anionic surfactants. Examples of anionic surfactants include sulfonates, carboxylates, and phosphates. Examples of cationic surfactants include quaternary amines.

Surfactants can be either external or internal. External surfactants are surfactants are not chemically reacted into the polymer during dispersion preparation. Internal surfactants are chemically reacted into the polymer during dispersion preparation. A surfactant can be included in an amount ranging from about 0.01 to about 20 parts per 100 parts by weight of polyurethane component.

Examples of suitable blowing agents are gases such as air, carbon dioxide, nitrogen, argon, and helium; liquids such as water and volatile halogenated alkanes; and azo-blowing agents such as azobis(formamide). Volatile halogenated alkanes include the various chlorofluoromethanes and chlorofluoroethanes. The use of a gas as a blowing or frothing agent is preferred. Particularly preferable is the use of air as a blowing or frothing agent. A frothing agent can differ from a blowing agent in that frothing agents are typically introduced by mechanical introduction of a gas into a liquid to froth the polymeric composition.

A polyurethane dispersion of the present invention can be stored for later application to the back of a carpet. Storage for this purpose requires that the dispersion be storage-stable. Alternatively, the polyurethane dispersion can be applied in a continuous manner to the back of a carpet primary backing. That is, the dispersion can be applied to the back of a carpet as the dispersion is obtained. Polyurethane dispersions applied to a carpet in a continuous manner are not required to be storage-stable, and can have higher solids content and/or larger mean particle size than typical storage-stable polyurethane dispersion formulations.

A suitable storage-stable polyurethane dispersion as defined herein is any polyurethane dispersion having a mean particle size of less than about 5 microns; a more preferable mean particle size is less than about 1 micron. A polyurethane dispersion that is not storage-stable can have a mean particle size of greater than 5 microns. For example, a suitable dispersion can be prepared by mixing a polyurethane prepolymer with water and dispersing the prepolymer in the water using a commercial blender. Alternatively, a suitable dispersion can be prepared by feeding a prepolymer into a static mixing device along with water, and dispersing the water and prepolymer in the static mixer. Continuous methods for preparing aqueous dispersions of polyurethane are known and can be used in the practice of the present invention. For example, U.S. Pat. Nos. 3,437,624; 4,092,286; 4,237,264; 4,742,095; 4,857,565; 4,879,322; 5,037,864; and 5,221,710 describe continuous processes useful for obtaining aqueous polyurethane dispersions. In addition, a continuous process for preparing an aqueous polyurethane dispersion having a high internal phase ratio is described in U.S. Pat. No. 5,539,021, incorporated herein by reference.

The steps used in preparing a polyurethane carpet backing can be carried out in a continuous manner. For example, the prepolymer can be prepared from a suitable active hydrogen-containing compound in a continuous manner. The prepolymer can be loaded directly into a mixing device with water to obtain an aqueous dispersion. Ultimately, the aqueous polyurethane dispersion can be applied to a carpet primary backing in a continuous manner to obtain a polyurethane-backed carpet In preparing polyurethane-backed carpets according to the present invention, an aqueous polyurethane dispersion is applied as a layer of preferably uniform thickness onto one surface of a carpet primary backing. Aqueous polyurethane dispersions of the present invention can be applied as a precoat, a laminate layer, or a foam layer. Polyurethane precoats, laminate layers, and foam layers can be prepared by methods known in the art. Precoats, laminate layers and foam layers prepared from latexes are described in P. L. Fitzgerald, "Integral Latex Foam Carpet Cushioning", J. Coat Fab. 1977, Vol. 7 (pp. 107–120), and in R. P. Brentin, "Latex Coating Systems for Carpet Backing", J. Coat. Fab. 1982, Vol. 12 (pp. 82–91). In preparing a frothed polyurethane backing (frothing), it is preferred to mix all components and then blend a gas into the mixture, using equipment such as an Oakes or Firestone foamer.

The polyurethane-forming composition can be applied to one surface of a carpet primary backing before it cures to a tack-free state. Alternatively, a polyurethane dispersion containing no unreacted isocyanate functionality can be applied, thereby removing the need to cure the polymer. Typically the polyurethane-forming composition is applied to the surface attached to a primary backing.

The composition may be applied and gauged to the carpet primary backing using equipment such as a doctor knife, air knife, or extruder. Alternatively, the composition may be applied by (1) forming it into a layer on a moving belt or other suitable apparatus, (2) dehydrating or partially curing, and (3) finally, marrying it to the carpet primary backing. It may be married to the carpet primary backing with equipment such as a double belt laminator (also known as double band) or a moving belt with an applied foam cushion.

The amount of polyurethane-forming composition used can vary widely, from about 5 to about 500 ounces per square yard, depending on the characteristics of the textile. After the layer is applied and gauged, water is removed from the dispersion and the layer can be cured using heat from any suitable heat source such as an infrared oven, a convection oven, or heating plates.

A styrene-butadiene latex useful for practicing the present invention is disclosed in P. L. Fitzgerald, "Integral Latex Foam Carpet Cushioning", J. Coat. Fab. 1977, Vol. 7 (pp. 107–120) and in R. P. Brentin, "Latex Coating Systems for Carpet Backing", J. Coat. Fab. 1982, Vol. 12 (pp. 82–91), both incorporated herein by reference. A styrene-butadiene-vinylidene chloride latex useful for practicing the present invention is disclosed in U.S. Pat. No. 5,741,393, incorporated herein by reference.

U.S. Pat. No. 5,770,660, incorporated herein by reference, discloses a method for preparing a butadiene-acrylonitrile latex that is useful for practicing the present invention. U.S. Pat. Nos. 3,644,262 and 4,164,489, incorporated herein by reference, disclose methods for preparing ethylene-vinyl-acetate latexes that are useful for practicing the present invention. U.S. Pat. No. 5,591,806, incorporated herein by reference, discloses a method for preparing an ethylene acrylic acid aqueous dispersion that is useful for practicing the present invention.

U.S. Pat. Nos. 3,890,261 and 5,661,205, incorporated herein by reference, disclose methods for preparing chloroprene latexes useful for practicing the present invention. U.S. Pat. No. 5,380,785, incorporated herein by reference, discloses a method for preparing a butyl acrylate-acrylonitrile-styrene latex that is useful for practicing the present invention. U.S. Pat. Nos. 4,689,256 and 5,300,551, incorporated herein by reference, disclose methods for preparing vinyl chloride polymer latexes that are useful in practicing the present invention.

U.S. Pat. No. 5,591,806, incorporated herein by reference, discloses a method for preparing a ethylene acrylic acid copolymer latex that is useful in practicing the present invention. U.S. Pat. No. 4,714,728, incorporated herein by reference, discloses a method for preparing an aqueous dispersion of acidic ethylene interpolymers that are useful in practicing the present invention.

U.S. Pat. No. 4,228,058, incorporated herein by reference, discloses a method for preparing a mixture of vinylidene chloride latex and a styrene-butadiene latex useful in practicing the present invention. Other methods of preparing useful aqueous dispersed polymeric compositions would be readily apparent to a person of ordinary skill in the art in view of this disclosure. Those methods and aqueous dispersed polymeric compositions are within the scope of the invention with regard to preparing useful aqueous dispersed polymeric compositions.

The inorganic fillers of the present invention include calcium carbonate, calcium sulfate, kaolin, lignite fly ash, silica, talc, feldspar, mica, glass spheres, wollastonite, aluminum trihydrate, aluminum oxide, fiber glass, similar compounds, and mixtures thereof. In the present invention, the preferred inorganic filler is calcium carbonate.

The hydrophobic acids and salts of hydrophobic acid for treating the inorganic filler mixtures of the present invention include C4 to C22 acids and salts thereof. Also, the acids can be saturated or unsaturated. Examples of such acids include, but are not limited to, butyric acid, hexanoic acid, octanoic acid, decanoic acid, dodecanoic acid, lauric acid, myristic acid, palmitic acid, oleic acid, linoleic acid, stearic acid, linolenic acid, similar compounds, and mixtures thereof. In the present invention, the preferred acid-treated inorganic filler is stearic acid-treated calcium carbonate.

The salts of any of the hydrophobic acids described herein, alone or in admixture with any other salt or hydrophobic acid, can be useful in the practice of the present invention. Preferably, the salt is selected from the group consisting of calcium stearate, lithium stearate, and zinc stearate, and more preferably, zinc stearate, and most preferable, wettable zinc stearate. Wettable zinc stearate is easily and uniformly compounded with a polyurethane dispersion and yields superior spill resistance. The preferred inorganic filler and hydrophobic salt combination is calcium carbonate with zinc stearate.

Other useful hydrophobic acids or hydrophobic acid salts include gum rosin, wood rosin, tall oil rosin, abietic acid, oxidized polyethylene containing carboxylic acid groups, ethylene-acrylic acid copolymers, ethylene-methacrylic acid copolymers, polyolefins grafted, with unsaturated carboxylic acids, polyolefins grafted with anhydrides such as maleic anhydride, methacrylic acid, maleic acid, fumaric acid, acrylic acid, and the like.

The hydrophobic acid or a salt thereof can be added to the carpet backing formulation mixture in an amount of from about 0.025% weight by weight (w/w) to about 10% (w/w), based on the total weight of solids present in the mixture. Preferably the hydrophobic acid or its salt is added in an amount of from about 0.5% (w/w) to about 6.0% (w/w), more preferably form about 1.0% (w/w) to about 3.0% (w/w) most preferably from about 1.0% (w/w) to about 2.0% (w/w), based on total solids.

The inorganic filler can also be surface treated with the hydrophobic acid or its salt prior to introduction into the carpet backing dispersion formulation. This may be accomplished in a variety of ways. For example, the hydrophobic acid may be surface coated onto the filler in a high intensity mixer above the melting point of the hydrophobic acid. Another method involves the spraying of the aqueous dissolved or dispersed hydrophobic acid or its salt onto the agitated filler.

In an alternate embodiment, the aqueous dispersed polymeric composition comprises an aqueous dispersed polymeric material and a treated inorganic filler, having been treated with a hydrophobic compound selected from the group consisting of a hydrophobic acid, a salt of a hydrophobic acid, and mixtures thereof.

In another alternate embodiment of the present invention, a kit for preparing a spill resistant carpet backing is provided. It comprises an aqueous dispersed polymeric material, an inorganic filler, and a hydrophobic compound selected from the group consisting of a hydrophobic acid, a salt of a hydrophobic acid, and mixtures thereof. Alternatively, the kit can comprise an aqueous dispersed polymeric material and a treated inorganic filler, having been treated with a hydrophobic compound selected from the group consisting of a hydrophobic acid, a salt of a hydrophobic acid, and mixtures thereof.

The present invention also provides a method for preparing a spill resistant carpet backing comprising (a) mixing an inorganic filler with an aqueous dispersed polymeric material and (b) admixing a hydrophobic compound selected from the group consisting of a hydrophobic acid, a salt of a hydrophobic acid, and mixtures thereof. Alternatively, the method can comprise (a) treating an inorganic filler with a hydrophobic compound selected from the group consisting of a hydrophobic acid, a salt of a hydrophobic acid, and mixtures thereof and (b) mixing the treated inorganic filler with an aqueous dispersed polymeric material.

EXAMPLES

The following examples merely exemplify various embodiments of the invention. It is understood that the following examples are provided to further illustrate the invention. They do not in anyway limit the scope of the present invention.

Table of Compounds

The following compounds were used in the preparation of the exemplified dispersions. The table provides the compound's generic name, its trade mark name, and its vendor.

| Generic Name | Trade Mark | Vendor |
|---|---|---|
| ethylene oxide capped polypropylene oxide diol, 2000 molecular weight | VORANOL ™ 5287 Polyol | The Dow Chemical Company |
| 50:50 mixture of 2,4'-diisocyanatodiphenylmethane and 4,4'-diisocyanatodiphenylmethane | ISONATE ™ 50 MDI | The Dow Chemical Company |
| 25:75 mixture of 2,4'-diisocyanatodiphenylmethane and 4,4'-diisocyanatodiphenylmethane | ISONATE ™ 25 OP MDI | The Dow Chemical Company |
| Dispersing surfactant | DeSulf DBS-60T | Deforest Enterprises Inc. |
| Hydrocarbon-based defoamer | Nopco NDW | Henkel Corp. |
| Silicon-based aqueous dispersions | DC 85 | Dow Corning Corp |
| Calcium carbonate | Georgia Marble #8 | Georgia Marble Co. |
| Stearic acid treated calcium carbonate | Georgia Marble CS11 | Georgia Marble Co. |
| Aqueous ethylene acrylic acid dispersion | Michem P4983-40R | Michem |
| Liquid ammonium stearate (33%) | STANFAX 320 | Parachem Southern Inc. |
| Zinc stearate dispersion | Synpro Zincloid ™ | Ferro Chemical Co. |
| Zinc stearate | Synpro Zn stearate GP | Ferro Chemical Co. |
| Zinc stearate | Synpro Zn stearate wettable | Ferro Chemical Co. |
| Zinc stearate | Synpro Zn stearate S-1058 | Ferro Chemical Co. |

Aqueous Polyurethane Dispersion Preparation

For Example Nos. 1 and 13–23, a prepolymer was prepared by reacting 63.35 percent by weight (% w/w) VORANOL™ 5287 polyol, 33.3% w/w ISONATE™50 MDI, 1.35% w/w diethylene glycol, and 2.00% w/w polyethylene oxide monol having a molecular weight of 950. Example Nos. 2–6 used ISONATE™ 25 OP MDI for the precoat layer instead., of ISONATE™ 50 MDI; the laminate layer was prepared with ISONATE™ 50 MDI. Example Nos. 13–18 were prepared with 1.63 parts per hundred resin of Paragum™ 241. Example Nos. 24 and 25 were prepared with a secondary backing. All layers were prepared with 5 parts per hundred of Nopco NDW.

The remaining steps were conducted at an ambient temperature of 19° C.

The prepolymer was fed continuously at a rate of 32.1 gallons/minute (121.5 liters/minute) through a first arm fitted to a first T. DeSulf DBS-60T surfactant was fed at a rate of 1.61 gallons/minute (6.09 liters/minute) through a first arm of a second T and merged with a water stream flowing at a rate of 5.5 gallons/minute (20.8 liters/minute) through the second arm of the second T. The prepolymer stream and the water/surfactant stream were merged at the first T and passed through a static mixer.

Next, they were fed to the input port of a IKA-SD 41 Super-Dispax™ dispersing instrument (a trademark of Ika Works, Inc.). The IKA-SD 41 Super-Dispax™ dispersing instrument is a rotor/stator device, which was operated at 1200 rpm. The ratio of feeds into the dispersing instrument was 81.9% prepolymer, 4.1% surfactant solution, and 14.0% water.

A high internal phase ratio (HIPR) emulsion formed in the dispersing instrument. It had a volume average particle size of 0.285 microns and a polydispersity of 3.1 as measured by a Coulter LS130 particle size analyzer.

The HIPR emulsion from the dispersing instrument was fed into a first arm attached to a third T and merged with an aqueous stream fed through a second arm of the third T at the rate of 5.1 gallons/minute (19.3 liters/minute). The output of the combined streams was fed into one arm of a fourth T that was attached to the input of a Lightnin™ model 0.25 LB in-line blender (a trademark of Greey/Lightnin).

Chain extension was accomplished in the in-line blender by concurrently pumping a. 10% aqueous piperazine solution through the other arm of the fourth T. The piperazine solution was added at a constant rate of 18.0 gallons/minute (68.1 liters/minute) (0.75 equivalents based on the isocyanate groups of the prepolymer). The two streams were mixed in the in-line blender operating at 1500 rpm.

The product was collected and allowed to stand overnight to allow the water to react with the react with the remaining isocyanate groups. The resulting stable poly(urethane/urea) dispersion was found to have a solids content of 56.0% by weight and a volume average particle size of 0.256 microns and a polydispersity of 3.5 as measured by a Coulter LS 230 particle size analyzer.

Example No. 7—Styrene-Butadiene Latex Preparation

A styrene-butadiene latex test sample was substituted in the polyurethane dispersion formulations. The latex contained approximately fifty-percent solids.

British Spill Test Carpet Coating Sample Preparation

The British Spill Test Carpet Coating samples were prepared using the following method. First, a carpet sample was stretched onto a frame. Next, the carpet was held in place on a tandem roll coater. A permanent marker was used to mark off an 11"×14" (28 cm×35.6 cm) area on the carpet.

The amount of precoat and laminate to achieve the desired coat weight was determined using the following calculation:

a) Calculate area to cover (yd$^2$)=length*width=11"*14"= 154 in$^2$*(1 yd$^2$/1296 in$^2$)=0.119 yd$^2$(0.099 m$^2$);

b) Target DRY 38 oz/yd$^2$(900.7 g/m$^2$) 80% precoat–30.4 oz/yd$^2$(720.5 g/m$^2$) 20% laminate=7.6 oz/yd$^2$(180.1 g/m$^2$);

c) Target WET 30.4 oz/yd$^2$(730.5 g/m$^2$)/0.762 solids=39.9 oz/yd$^2$(945.6 g/m$^2$) 7.6 oz/yd$^2$(180.1 g/m$^2$)/0.762 solids=9.60 oz/yd$^2$(227.5 g/m$^2$);

d) For precoat, convert oz to grams (39.9 oz/yd$^2$)(11b/16 oz)(454 g/11b)=1132 g/yd$^2$ (945.6 g/m$^2$);

e) Use calculated coverage area to give grams needed (1132 g/yd$^2$)*0.119 yd$^2$=134.7 g;

f) Add 20 g to account for coverage on the jumbo roller; and g) Repeat steps d–f for the laminate coat and add only an additional 10 grams for jumbo roller coverage.

The roller was placed such that its milled gap and side bars were at the top of the carpet The precoat was poured and distributed evenly in front of the roller. Without applying any pressure, the ends of the roller were held and rolled to the permanent mark at the end of the carpet. The jumbo roller with two side weights was rolled from the bottom up and down two times.

The laminate was weighed out. The roller without the milled gap was placed at the top of the carpet. The laminate was poured and distributed evenly in front of the roller. Without applying any pressure, the ends of the roller were held and dragged to the permanent mark at the end of the carpet.

The carpet was then clipped in place at the edges of the frame and immediately placed into a 400° F. (204° C.) oven until the pyrometer read a temperature of 265° F. (129° C.) on the carpet. The carpet was then removed from the oven and allowed to cool to room temperature. After the carpet was cooled, it was removed from the frame and placed in a controlled environment to equilibrate.

Example Nos. 24 and 25—Carpets with Secondary Backing Preparation

The secondary backing carpet Example Nos. 24 and 25 were prepared using the following method. First, a carpet sample was held down at its top and bottom edges to a Plexiglas surface. Next, a permanent marker was used to mark off an 11"×15" (28 cm×38.1 cm) area on the carpet.

The amount of precoat and laminate to achieve the desired coat weight was determined using the following calculation:

a) Calculate area to cover (yd$^2$)=length *width=11"*15"= 165 in$^2$*(1 yd$^2$/1296 in$^2$)=0.127 yd$^2$(0.106 m$^2$);

b) Target DRY 44 oz/yd$^2$(1042.8 g/m$^2$) 80% precoat–35.2 oz/yd$^2$(834.2 g/m$^2$) 20% laminate=8.8 oz/yd$^2$(208.6 g/m);

c) Target WET 35.2 oz/yd$^2$(834.2 g/m$^2$) /0.762 solids= 46.2 oz/yd$^2$(1094.9 g/m$^2$) 8.8 oz/yd$^2$(208.6 g/m$^2$)/0.762 solids=11.1 oz/yd$^2$(263.1 g/m$^2$);

d) For precoat, convert oz to grams (46.2 oz/yd$^2$)(11b/16 oz)(454 g/11b)=1311 g/yd$^2$ (1096 g/m$^2$);

e) Use calculated coverage area to give grams needed (1311 g/yd$^2$)*0.127 yd=166.5 g;

f) Add 20 g to account for coverage on the jumbo roller; and g) Repeat steps d–f for the laminate coat and add only an additional 10 grams for jumbo roller coverage.

The roller was placed such that its milled gap and side bars were at the top of the carpet. The precoat was weighed out The precoat was poured and distributed evenly in front of the roller. Without applying any pressure, the ends of the roller were held and rolled to the permanent mark at the end of the carpet. The jumbo roller with two side weights was rolled from the bottom up and down two times.

The laminate was weighed out. The roller without the milled gap was placed at the top of the carpet. The laminate was poured and distributed evenly in front of the roller. Without applying any pressure, the ends of the roller were held and dragged to the permanent mark at the end of the carpet.

A drawdown box with its 25 mm side down was placed on a second piece of Plexiglas. The drawdown box was filled to ¾ full with evenly distributed precoat. With a downward pressure, the drawdown box was used to put a film of the compound onto the second piece of Plexiglas.

A piece of secondary backing was cut to the size of the carpet and placed on top of the film. A roller was rolled over the backing to the end of the glass. The secondary backing was removed from the glass and placed over the coated area of the carpet such that coated area of the backing faced the coated area of the carpet.

The carpet and the secondary backing were held together with a weight at their top edge. The coatings were married together with a roller.

The carpet and the secondary backing were placed into a 275° F. (135° C.) oven until the pyrometer read a temperature of 265° F. (129° C.) on the carpet. The carpet was then removed from the oven and placed in a controlled environment to equilibrate.

Production Scale Example Nos. 8–12

A 3300-pound (1497 kg) batch of the precoat compound and a 3200-pound (1451 kg) batch of the laminate compound were prepared using standard compound mixing equipment. The finishing range consisted of a dual director applicator and a scrim pan-roll coater. The direct coaters were set up to split the precoat and laminate coatings to a desired 80-20 distribution.

A first roll coater had a six inch (15.2 cm) diameter and ran at 30+ rpm. The second roll coater had an eight inch (20.3 cm) diameter and was maintained stationary. The adhesive pan was as small as practical for the roll coater and auxiliary edge coater rolls.

The tufted carpet fibers through the primary backing was coated face down with the precoat roller speed set at the speed of the carpet and weight set at normal production rates. The laminate roller was fixed and gapped. A lick roll coater that positioned directly in the adhesive pan was used to apply the precoat. The wet coating wet distribution was 40 opsy (ounces per square yard) (948 g/m$^2$) precoat, 10 opsy (237 g/m$^2$) laminate coat, and 8 opsy (1.90 g/m$^2$) adhesive coat After marrying, the carpet with its face up was dried in a 400° F. (204° C.) oven.

Tables 1–4

Table 1 contains the formulation properties for Example Nos. 1–33. Table 1 also identifies the additives and inorganic fillers, if any, and the amounts added in parts per hundred resin.

Table 2 contains the physical properties of Example Nos. 1–7. Example Nos. 16 contained 200 pph filler loads in the laminate layers with non-treated calcium carbonate. Example 4 also contained 25% stearic acid-treated calcium carbonate filler in the precoat But, all failed the British Spill test.

Table 3 contains physical testing data for Example Nos. 8–12. Example Nos. 8–10 were non-treated calcium carbonate carpet samples, and Example Nos. 11–12 were prepared with stearic acid-treated calcium carbonate. The laminate layers contained 200 pph filler loads. All of the non-treated carpet samples failed the British Spill test while both of the acid-treated samples passed.

Table 4 contains physical testing data for Example Nos. 13–33. Example No. 13 was prepared with ammonium stearate. Example Nos. 14–18 were prepared with calcium stearate; Example Nos. 19, 24, 26, and 32 were prepared with an ammonium stearate/calcium carbonate combination; and Example Nos. 20–23, 25, 27–31, and 33 were prepared with a zinc stearate/calcium carbonate combination. Example No. 13 passed the British Spill test. While Example No. 14 had no bleed through, it had a watermark. Example Nos. 15–18 passed the British Spill test. Example Nos. 14–18 demonstrate that calcium stearate generally provides good spill resistance as measured by the British Spill test Example Nos. 19, 24, 26, and 32 passed the British Spill test, but each had a watermark. Example Nos. 19, 24, 26, and 32 demonstrate that ammonium stearate provides good spill resistance as measured by the British Spill test Similarly, Example Nos. 20–23, 25, 27–31, and 33 passed the British Spill test, but Example Nos. 2–23, 27–28, and 30–31 had a watermark. Significantly, Example Nos. 30 and 31 only demonstrated a small watermark after 5 hrs and Example No. 33 did not show a watermark. Example Nos. 20–23, 25, 27–31, and 33 illustrate that the combination of zinc stearate and calcium carbonate provides spill resistance as measured by the British Spill test:

TABLE 1

| Example # | 1 | 2 | 3 | 4 | 5 | 6 | 7 |
|---|---|---|---|---|---|---|---|
| Precoat - Properties | | | | | | | |
| Filler Load | 150 | 150 | 150 | 150 | 150 | 150 | 150 |
| AFV[1], #3 @ 20 rpm, cps | N/A | N/A | N/A | N/A | N/A | N/A | N/A |
| AF cup wt, g/3 oz. (g/85 g) | N/A | N/A | N/A | N/A | N/A | N/A | N/A |
| Compound Visc. (#5 @ 20 rpm), cps | 16500 | N/A | N/A | N/A | N/A | N/A | 12980 |
| Compound Cup wt, g/3 oz. (g/85 g) | 123.6 | N/A | N/A | N/A | N/A | N/A | N/A |
| Additives | ATH[2] | None | ATH | 25% CS11 | MP[3] | 5% DC85 | None |
| Coat Visc. (#5 @ 20 rpm), cps | 16340 | 10460 | 12300 | 12020 | N/A | 16100 | 13420 |
| Coating Cup wt, g/3 oz. (g/85 g) | 126.1 | 132.3 | 118.6 | 108.6 | N/A | 129 | 126.3 |
| Coat weight, oz/yd$^2$ (g/m$^2$) | | 41.7 (988) | 39.2 (929) | 38.1 (903) | N/A | 39.9 (946) | 38.2 (905) |
| Laminate Coat - Properties | | | | | | | |
| Filler Load | 200 | 200 | 200 | 200 | 200 | 200 | 200 |
| Filler | GM 8[4] | GM 8 | GM 8 | GM 8 | GM 8 | GM 8 | GM 8 |
| Filler Description | CaCO$_3$ | CaCO$_3$ | CaCO$_3$ | CaCO$_3$ | CaCO$_3$ | CaCO$_3$ | CaCO$_3$ |
| Compound Visc. (#5 @ 20 rpm), cps | 18800 | 19300 | 19300 | 19300 | 19300 | 19300 | 31450 |
| Compound Cup wt, g/3 oz. (g/85 g) | N/A | N/A | N/A | N/A | N/A | N/A | N/A |
| Additives | None | None | None | None | None | None | None |
| Coat Visc. (#5 @ 20 rpm), cps | 21800 | 21800 | N/A | N/A | N/A | N/A | 29500 |
| Coating Cup wt, g/3 oz. (g/85 g) | 131.4 | 131.4 | N/A | N/A | N/A | N/A | 131.4 |

| Example # | 8 | 9 | 10 | 11 | 12 |
|---|---|---|---|---|---|
| Precoat - Properties | | | | | |
| Filler Load | 150 | 150 | 200 | 200 | 200 |
| Additives | | | | | |
| Coat Visc. (#5 @ 20 rpm), cps | 10360 | 10360 | 22350 | 28000 | 28000 |
| Coating Cup wt, g/3 oz. (g/85 g) | 124.5 | 124.5 | 140.2 | 143.1 | 143.1 |
| Laminate Coat - Properties | | | | | |
| Filler Load | 200 | 200 | 200 | 200 | 200 |
| Filler | GM 8 | GM 8 | GM 8 | CS11 | CS11 |
| Filler Description | CaCO$_3$ | CaCO$_3$ | CaCO$_3$ | Acid CaCO$_3$ | Acid CaCO$_3$ |
| Additives | | | | | |
| Coat Visc. (#5 @ 20 rpm), cps | 18050 | 18050 | 22350 | 28000 | 28000 |
| Coating Cup wt, g/3 oz. (g/85 g) | 137.9 | 137.9 | 140.2 | 143.1 | 143.1 |

[1] AFV = after filler viscosity;
[2] ATH = aluminum trihydrate;
[3] MP = Michem P4983-40R;
[4] GM 8 = Georgia Marble #8 Calcium carbonate

| Example # | 13 | 14 | 15 | 16 | 17 | 18 | 19 | 20 |
|---|---|---|---|---|---|---|---|---|
| Laminate Coat - Properties | | | | | | | | |
| Filler Load (Total) | 200 | 200 | 200 | 200 | 200 | 200 | 200 | 200 |
| Filler | None | Ca Stearate | Ca Stearate | Ca Stearate | Ca Stearate | Ca Stearate | NH$_4$ Stearate/ GM 8 | ZsD[9]/ GM 8 |

-continued

| | | | | | | | | |
|---|---|---|---|---|---|---|---|---|
| Filler Load (Ca Stearate) | 0 | 1.0 | 1.0 | 2.0 | 5.0 | 10.0 | | |
| Filler Load (Stearate Compound - NH$_4$/Zn) | | | | | | | 0.75/0 | 0/1.0 |
| Additives | STANFAX ™ NH$_4$ Stearate .75 phr[5] | | | | | | | |
| Coat Visc. (#5 @ 20 rpm), cps | 23350 | 20200 | 22150 | 22700 | 24250 | 25700 | 21350 | 16780 |
| Coating Cup wt, g/3 oz. (g/85 g) | 125.79 | 129.60 | 132.00 | 139.50 | 134.50 | 126.70 | 134.39 | 129.66 |
| Coating weight, g/3 oz (g/85 g) | | | | | | | 42.60 | 40.71 |

| Example # | 21 | 22 | 23 | 24 | 25 | 26 | 27 | 28 |
|---|---|---|---|---|---|---|---|---|
| Laminate Coat - Properties | | | | | | | | |
| Filler Load (Total) | 200 | 200 | 200 | 200 | 200 | 200 | 200 | 200 |
| Filler | ZsG[10]/ GM 8 | ZsW[11]/ GM 8 | ZsS[12]/ GM 8 | NH$_4$ Stearate/ GM 8 | ZsW/ GM 8 | NH$_4$ Stearate/ GM 8 | ZsW/ GM 8 | ZsW/ GM 8 |
| Filler Load (Ca Stearate) | | | | | | | | |
| Filler Load (Stearate Compound - NH$_4$/Zn) Additives | 0/5.0 | 0/5.0 | 0/5.0 | 0.75/0 | 0/5 | 0.75/0 | 0/1.0 | 0/3.5 |
| Coat Visc. (#5 @ 20 rpm), cps | 20100 | 20300 | 20250 | 21350 | 20300 | 20450 | 2240 | 23200 |
| Coating Cup wt, g/3 oz. (g/85 g) | 139.26 | 134.16 | 129.30 | 134.39 | 134.16 | 129 | 139.4 | 135.5 |
| Coating weight, g/3 oz (g/85 g) | 43.04 | 45.06 | 42.53 | 50.45 | 50.71 | 40.08 | 43.15 | |

| Example # | 29 | 30 | 31 | 32 | 33 |
|---|---|---|---|---|---|
| Laminate Coat - Properties | | | | | |
| Filler Load (Total) | 200 | 200 | 200 | 200 | 200 |
| Filler | ZsW/ GM 8 | ZsW/ GM 8 | ZsW/ GM 8 | NH$_4$ GM 8 Stearate/ GM 8 | ZsG/ GM 8 |
| Filler Load (Ca Stearate) | | | | | |
| Filler Load (Stearate Compound - NH$_4$/Zn) Additives | 0/5.0 | 0/10.0 | 0/20.0 | 0.75/0 | 0/5.0 |
| Coat Visc. (#5 @ 20 rpm), cps | 20650 | 21050 | 25900 | 24500 | 20550 |
| Coating Cup wt, g/3 oz. (g/85 g) | 133.1 | 132.1 | 130.3 | 137.37 | 129.9 |
| Coating weight, g/3 oz (g/85 g) | 41.40 | 40.87 | 40.98 | 44.81 | 42.12 |

[5] phr = parts per hundred resin
[9] ZsD = Zinc stearate dispersion;
[10] ZsG = Zinc stearate GP;
[11] ZsW = Zinc stearate wettable;
[12] Zinc stearate S-1058

TABLE 2

| Ex.# | Tuft Bind (lb/kg) | Tuft Bind (Wet 20 min) (lb/kg) | % R. | Tuft Bind (Wet 4 hr) (lb/kg) | Delam. (lb/in)/ (kg/cm) | Delam. (Wet 1 Min) (lb/in)/ (kg/cm) | % R. | Delam. (Wet 4 hr) (lb/in)/ (kg/cm) | Edge Ravel (lb/kg) | Edge Ravel (Wet 4 hr) (lb/kg) | British Spill |
|---|---|---|---|---|---|---|---|---|---|---|---|
| 1 | | | | | | | | | | | Fail @ 400° F. (204° C.) |
| 2 | 20 (9.08) | | | | 11.1 (1.98) | 6.9 (1.23) | 62.2 | | | | Fail @ 400° F. (204° C.) |
| 3 | 22 (9.99) | | | | 11.2 (1.99) | 7.2 (1.28) | 64.3 | | | | Fail @ 400° F. (204° C.) |
| 4 | 19.6 (8.90) | | | | 11.9 (2.12) | 9.7 (1.73) | 81.5 | | | | Slight Fail @ 400° F. (204° C.) |
| 5 | | | | | | | | | | | Fail @ 400° F. (204° C.) |
| 6 | 20.2 (9.17) | | | | 11.3 (2.01) | 7.4 (1.32) | 65.5 | | | | Fail @ 400° F. (204° C.) |
| 7 | 20.4 (9.26) | | | | 10.8 (1.92) | 9.6 (1.71) | 88.9 | | | | np @ 400° F. (204° C.), Blistered |

R. = Retention; Delam. = Delamination; PH = Pinhole; wm = Watermark; Swm = Slight Watermark
VSwm = Very Slight Watermark; SM = Smudge; No BT = No Bleed Through; np = Near Pass

TABLE 3

| Ex.# | Tuft Bind (lb/kg) | Tuft Bind (Wet 20 min) (lb/kg) | % R. | Tuft Bind (Wet 4 hr) (lb/kg) | Delam. (lb/in)/ (kg/cm) | Delam. (Wet 1 Min) (lb/in)/ (kg/cm) | % R. | Delam. (Wet 4 hr) (lb/in)/ (kg/cm) | Edge Ravel (lb/kg) | Edge Ravel (Wet 4 hr) (lb/kg) | British Spill |
|---|---|---|---|---|---|---|---|---|---|---|---|
| 8 | 22.8 (10.4) | | | 9 (4.09) | 9.7 (1.73) | | | 4.1 (0.73) | 4.7 (2.13) | 1.4 (0.64) | Fail |
| 9 | 20.8 (9.44) | | | 9.1 (4.13) | 9.7 (1.73) | | | 4 (0.71) | 4 (1.82) | 1.2 (0.54) | Fail |
| 10 | 21.3 (9.67) | | | 8.7 (3.95) | 9.1 (1.62) | | | 4 (0.71) | 3.8 (1.73) | 0.9 (0.41) | Fail |
| 11 | 23.1 (10.5) | | | 10.4 (4.72) | 14.1 (2.51) | | | 7.8 (1.39) | 4.8 (2.18) | 1.7 (0.77) | Pass |
| 12 | 18.2 (8.26) | | | 9 (4.09) | 11.9 (2.12) | | | 6.3 (1.12) | 4.5 (2.04) | 1.4 (0.64) | Pass |

R. = Retention; Delam. = Delamination; PH = Pinhole; wm = Watermark; Swm = Slight Watermark
VSwm = Very Slight Watermark; SM = Smudge; No BT = No Bleed Through; np = Near Pass

TABLE 4

| Ex.# | Tuft Bind (lb/kg) | Tuft Bind (Wet 20 min) (lb/kg) | % R. | Tuft Bind (Wet 4 hr) (lb/kg) | Delam. (lb/in)/ (kg/cm) | Delam. (Wet 1 Min) (lb/in)/ (kg/cm) | % R. | Delam. (Wet 4 hr) (lb/in)/ (kg/cm) | Edge Ravel (lb/kg) | Edge Ravel (Wet 4 hr) (lb/kg) | British Spill |
|---|---|---|---|---|---|---|---|---|---|---|---|
| 13 | 15.9 (7.22) | 6.7 (3.04) | | | | | | | | | Pass |
| 14 | 19.1 (8.67) | 6.8 (3.09) | | | | | | | | | No BT, wm |
| 15 | 18.7 (8.49) | 7.7 (3.50) | | | | | | | | | Pass |
| 16 | 17.2 (7.81) | 7.8 (3.54) | | | | | | | | | Pass |
| 17 | 18.8 (8.53) | 8.6 (3.90) | | | | | | | | | Pass |
| 18 | 18.3 (8.31) | 9.8 (4.45) | | | | | | | | | Pass |
| 19 | 17.5 (7.95) | 6.6 (3.00) | 38.0 | | | | | | | | Pass, wm |
| 20 | 16.4 (7.44) | 4.9 (2.22) | 30.0 | | | | | | | | Pass, wm |
| 21 | 16.2 (7.35) | 7.4 (3.36) | 45.7 | | | | | | | | Pass, VSwm |
| 22 | 16.0 (7.26) | 7.9 (3.59) | 49.3 | | | | | | | | Pass, VSwm |
| 23 | 16.5 (7.49) | 7.7 (3.50) | 46.8 | | | | | | | | Pass, VSwm |
| 24 | 18.4 (8.35) | 9.3 (4.22) | 50.5 | | | | | | | | Pass |
| 25 | 19.6 (8.90) | 14.0 (6.36) | 71.5 | | | | | | | | Pass |
| 26 | 17.2 (7.81) | 7.1 (3.22) | 41.2 | | | | | | | | Pass, wm |
| 27 | 20.5 (9.31) | 8.1 (3.68) | 39.6 | | | | | | | | Pass, wm |
| 28 | 20.0 (9.08) | 7.4 (3.36) | 36.9 | | | | | | | | Pass, wm |
| 29 | 17.0 (7.72) | 9.0 (4.09) | 52.9 | | | | | | | | Pass |
| 30 | 18.7 (8.49) | 8.0 (3.63) | 42.9 | | | | | | | | Pass, Swm @ 5 hrs |
| 31 | 19.0 (8.63) | 8.5 (3.86) | 45.0 | | | | | | | | Pass, Swm @ 5 hrs |
| 32 | 18.0 (8.17) | 7.9 (3.59) | 44.2 | | | | | | | | Pass, wm |
| 33 | 16.5 (7.49) | 10.3 (4.68) | 62.1 | | | | | | | | Pass |

R. = Retention; Delam. = Delamination; PH = Pinhole; wm = Watermark; Swm = Slight Watermark
VSwm = Very Slight Watermark; SM = Smudge; No BT = No Bleed Through; np = Near Pass The embodiments described herein are given to illustrate the scope and spirit of the present invention. The embodiments herein will make apparent to those skilled in the art other embodiments that may also be used. These other embodiments are within the scope of the present invention. Thus, the scope of the invention should be determined by the appended claims and their legal equivalents, rather than by the embodiments given herein.

What is claimed is:

1. An aqueous dispersed polymeric composition for preparing a spill resistant carpet backing comprising:
   a. an aqueous polyurethane dispersion;
   b. an inorganic filler; and
   c. a hydrophobic salt of a hydrophobic acid, wherein the hydrophobic acid is selected from the group consisting of butyric acid, hexanoic acid, octanoic acid, decanoic acid, dodecanoic acid, lauric acid, myristic acid, palmitic acid, oleic acid, linoleic acid, stearic acid, linolenic acid, gum rosin, wood rosin, tall oil rosin, abietic acid, oxidized polyethylene containing carboxylic acid groups, ethylene-acrylic acid copolymers, ethylene-methacrylic acid copolymers, polyolefins grafted with unsaturated carboxylic acids, polyolefins grafted with anhydrides, methacrylic acid, maleic acid, fumaric acid, acrylic acid and mixtures thereof.

2. The aqueous dispersed polymeric composition of claim 1, wherein the inorganic filler is treated with the hydrophobic salt prior to formation of the aqueous dispersed polymeric composition.

3. The aqueous dispersed polymeric composition of claim 1, wherein the inorganic filler is selected from the group consisting of calcium carbonate, calcium sulfate, kaolin, lignite fly ash, silica, talc, feldspar, mica, glass spheres, wollastonite, aluminum trihydrate, aluminum oxide, fiber glass, and mixtures thereof.

4. The aqueous dispersed polymeric composition of claim 3, wherein the hydrophobic salt of the hydrophobic acid has a cation that is lithium, calcium, zinc or a combination thereof.

5. The aqueous dispersed polymeric composition of claim 4, wherein the cation is calcium, zinc or combination thereof.

6. The aqueous dispersed polymeric composition of claim 5 wherein the hydrophobic salt is calcium stearate, zinc stearate or combination thereof.

7. The aqueous dispersed polymeric composition of claim 6, wherein the hydrophobic salt is zinc stearate.

8. The aqueous dispersed polymeric composition of claim 7, wherein the zinc stearate is wettable.

9. An aqueous dispersed polymeric composition for preparing a spill resistant carpet backing comprising:
   a. an aqueous dispersed material;
   b. an inorganic filler; and
   c. a hydrophobic salt of a hydrophobic acid.

10. The aqueous dispersed polymeric composition of claim 9, wherein the aqueous dispersed polymeric material is a polyurethane dispersion.

11. The aqueous dispersed polymeric composition of claim 9, wherein the inorganic filler has thereon a coating of the hydrophobic salt.

12. The aqueous dispersed polymeric composition of claim 9, wherein the aqueous dispersed polymeric material is selected from the group consisting of a polyurethane dispersion, a styrene-butadiene latex, a butadiene-acrylonitrile latex, an ethylene-vinyl acetate latex, a styrene-butadiene-butyl acrylate latex, a chloroprene latex, a polyethylene copolymer latex, an ethylene-styrene latex, a styrene-butadiene-vinylidene chloride latex, a styrene-alkyl acrylate latex, a vinyl latex, an acrylic latex, and mixtures thereof.

13. The aqueous dispersed polymeric composition of claim 9, wherein the inorganic filler is selected from the group consisting of calcium carbonate, calcium sulfate, kaolin, lignite fly ash, silica, talc, feldspar, mica, glass spheres, wollastonite, aluminum trihydrate, aluminum oxide, fiber glass, and mixtures thereof.

14. The aqueous dispersed polymeric composition of claim 9, wherein the hydrophobic salt of the hydrophobic acid has a cation that is lithium, calcium, zinc or combination thereof.

15. The aqueous dispersed polymeric composition of claim 14, wherein the cation is calcium, zinc or combination thereof.

16. The aqueous dispersed polymeric composition of claim 9, wherein the hydrophobic salt is calcium stearate, zinc stearate or combination thereof.

17. The aqueous dispersed polymeric composition of claim 16, wherein the hydrophobic salt is zinc stearate.

18. The aqueous dispersed polymeric composition of claim 17 wherein the hydrophobic salt is wettable zinc stearate.

19. The aqueous dispersed polymeric composition of claim 9, wherein the hydrophobic acid is selected from the group consisting of butyric acid, hexanoic acid, octanoic acid, decanoic acid, dodecanoic acid, lauric acid, myristic acid, palmitic acid, oleic acid, linoleic acid, stearic acid, linolenic acid, gum rosin, wood rosin, tall oil rosin, abietic acid, oxidized polyethylene containing carboxylic acid groups, ethylene-acrylic acid copolymers, ethylene-methacrylic acid copolymers, polyolefins grafted with unsaturated carboxylic acids, polyolefins grafted with anhydrides, methacrylic acid, maleic acid, fumaric acid, acrylic acid, and mixtures thereof.

20. A spill resistant carpet backing prepared using the aqueous dispersed polymeric composition of claim 1.

21. The spill resistant carpet backing of claim 20, wherein the spill resistant carpet backing is a carpet layer selected from the group consisting of a precoat, a laminate layer, and a foam layer.

22. A spill resistant carpet backing prepared using the aqueous polymeric composition of claim 9.

23. The spill resistant carpet backing of claim 22, wherein the spill resistant carpet backing is a carpet layer selected from the group consisting of a precoat, a laminate layer, and a foam layer.

24. An aqueous dispersed polymeric composition for preparing a spill resistant carpet backing comprising:
   (a) an aqueous dispersed polymeric material;
   (b) an inorganic filler; and
   (c) a hydrophobic compound selected from the group consisting of a hydrophobic acid, a salt of a hydrophobic acid and mixtures thereof, wherein the hydrophobic compound has a melting point of at least about 120° C.

25. The aqueous dispersed polymeric composition of claim 24, wherein the hydrophobic compound is zinc stearate, calcium stearate, lithium stearate or a combination thereof.

26. The aqueous dispersed polymeric composition of claim 24, wherein the melting point is at most about 212° C.

* * * * *